(No Model.)
O. L. F. BROWNE.
MILK STRAINER.
No. 350,110. Patented Oct. 5, 1886.
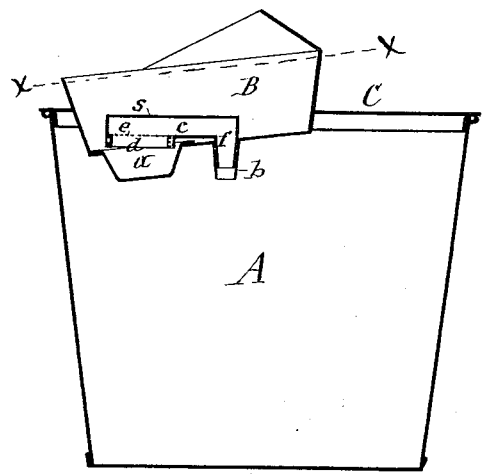
FIG-I-
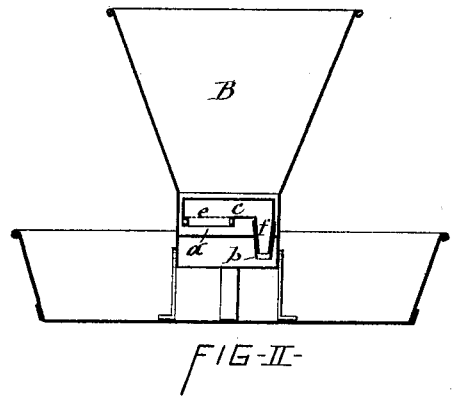
FIG-II-
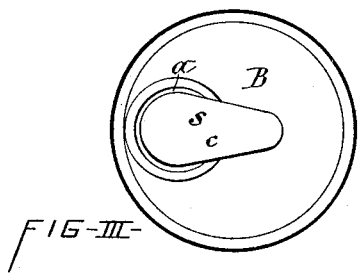
FIG-III-
FIG-IV-
WITNESSES
C. Bendixon
E. C. Cannon
Oliver L. F. Browne
INVENTOR per Duell, Lassett Hy
his Attys

UNITED STATES PATENT OFFICE.

OLIVER L. F. BROWNE, OF SYRACUSE, NEW YORK.

MILK-STRAINER.

SPECIFICATION forming part of Letters Patent No. 350,110, dated October 5, 1886.

Application filed August 6, 1885. Serial No. 173,718. (No model.)

*To all whom it may concern:*

Be it known that I, OLIVER L. F. BROWNE, of Syracuse, in the county of Onondaga, in the State of New York, have invented new and useful Improvements in Milk-Strainers, of which the following, taken in connection with the accompanying drawings, is a full, clear, and exact description.

The object of this invention is to filter liquids in such a manner as to obviate excessive agitation and the resultant disintegration or comminution of the impurities or foreign substances to be eliminated from the liquid, thereby more effectually purifying the liquid. This is one of the desiderata in the treatment of milk in dairies, and I have therefore adapted my invention more particularly for such uses, and the following description and the drawings hereto annexed describe and show my invention in connection with dairy appliances; but I wish it to be distinctly understood that I do not limit my invention solely to such applications.

In the accompanying drawings, Figure I is a vertical section of my invention applied to a milk-pail. Fig. II is a vertical section of my invention embodied in a form resembling externally a common milk-strainer. Fig. III is a horizontal section on line $x$ $x$, Fig. I; and Fig. IV is a detached inverted plan view of the conduit which conveys the milk from the trap or well to the discharge-opening of the filtering apparatus.

Similar letters of reference indicate corresponding parts in all the figures.

For use on milk-pails, I construct my invention as follows: To the top of the pail A, I fit a cap, C, which is formed with a basin, B, constituting the receptacle for the milk to be filtered, and the bottom of this basin is formed with a depression, $a$, to serve as a trap or well. At or near the highest side of the said trap or well the bottom of the basin B is provided with a discharge opening or spout, $b$, by which it communicates with the interior of the milk-pail A, as illustrated in Fig. I of the drawings.

$c$ represents a water-tight conduit, which is extended from the top of the trap $a$ to the spout $b$, and has its receiving-mouth $d$ on the under side of one end and facing the top of the trap, and horizontally across said mouth is spanned a filtering-diaphragm, $e$, which may consist either of fine textile fabric or other suitable filtering material. Said diaphragm is secured to an annular flange, $n$, around the mouth of the conduit by a band, $r$, fitted inside of said flange and binding the edges of the diaphragm between them. The diaphragm is thus removable for cleansing or renewing it when required. From the under side of the opposite end of the conduit projects a spout, $f$, which is inserted removably in the spout $b$, hereinbefore described, and fits closely thereto to support the conduit $c$.

By referring to Fig. III of the drawings it will be observed that the top of the conduit $c$ forms a guard or shield, $s$, which nearly completely covers the trap $a$, said guard or shield performing an important function when milking into the basin B, mounted on the pail A, as shown, the streams or jets of milk being thereby prevented from entering direct into the trap $a$, and are compelled to flow at a moderate speed from the bottom of the basin into the trap, around the top thereof, thus obviating agitation of the milk in the trap and guarding against disintegration or comminution of the impurities which attend the use of the common open pail in milking. The comparative calm state of the milk allows the impurities or foreign substances to a greater or less extent to precipitate in the trap $a$, and the filtering-diaphragm $e$, together with the moderate overflow of the milk from the trap through the diaphragm serves effectually to arrest the escape of the finer particles of foreign substances on the under side of the diaphragm, and thus thoroughly filter the milk. The purified milk passes through the conduit and enters the pail through the spout $f$.

In Fig. II of the drawings the receptacle B for the milk to be filtered is of the form of the body of an ordinary milk-strainer. The bottom of this receptacle is provided with a discharge opening or spout, $b$, and over the bottom is supported the conduit $c$, having at one end a spout, $f$, entering the spout $b$, and at the opposite end a receiving-mouth on its under side, across which mouth is spanned the filtering-diaphragm $e$. The bottom portion of the said receptacle up to the conduit *c* constitutes the trap *a*, from whence the milk rises through the filtering-diaphragm, and thence passes through the conduit and out through the spout thereof.

It will be observed that in each instance herein described and shown I filter the milk in an upward flow thereof, and provide underneath the filtering material a trap or well in which the milk is comparatively tranquil, to allow the heavier particles of foreign substances to settle out of reach of the pulverizing effect of the inflowing liquid, and the milk passes through the filtering material without undue pressure. This constitutes the salient feature of my invention, it insuring a thorough elimination of the impurities or foreign substances from the milk.

What I claim as my invention, and desire to secure by Letters Patent, is—

1. A filtering apparatus comprising a receptacle for the substance to be filtered, a trap or well at the bottom of said receptacle, a filtering-diaphragm over the trap, and a conduit over the diaphragm and leading from the same, substantially as set forth and shown.

2. The combination of a liquid-receptacle formed with a trap at its bottom, a discharge-opening at or near the top of the trap, a conduit extended from the top of the discharge-opening and having its mouth on its under side and facing the trap, and a filtering-diaphragm spanning the mouth of the conduit, substantially as described and shown.

In testimony whereof I have hereunto signed my name and affixed my seal, in the presence of two attesting witnesses, at Syracuse, in the county of Onondaga, in the State of New York, this 3d day of August, 1885.

OLIVER L. F. BROWNE. [L. S.]

Witnesses:
FREDERICK H. GIBBS,
E. C. CANNON.